(No Model.)
W. JÄGER.
GRAIN LIFTER FOR MOWING MACHINES.
No. 597,580. Patented Jan. 18, 1898.
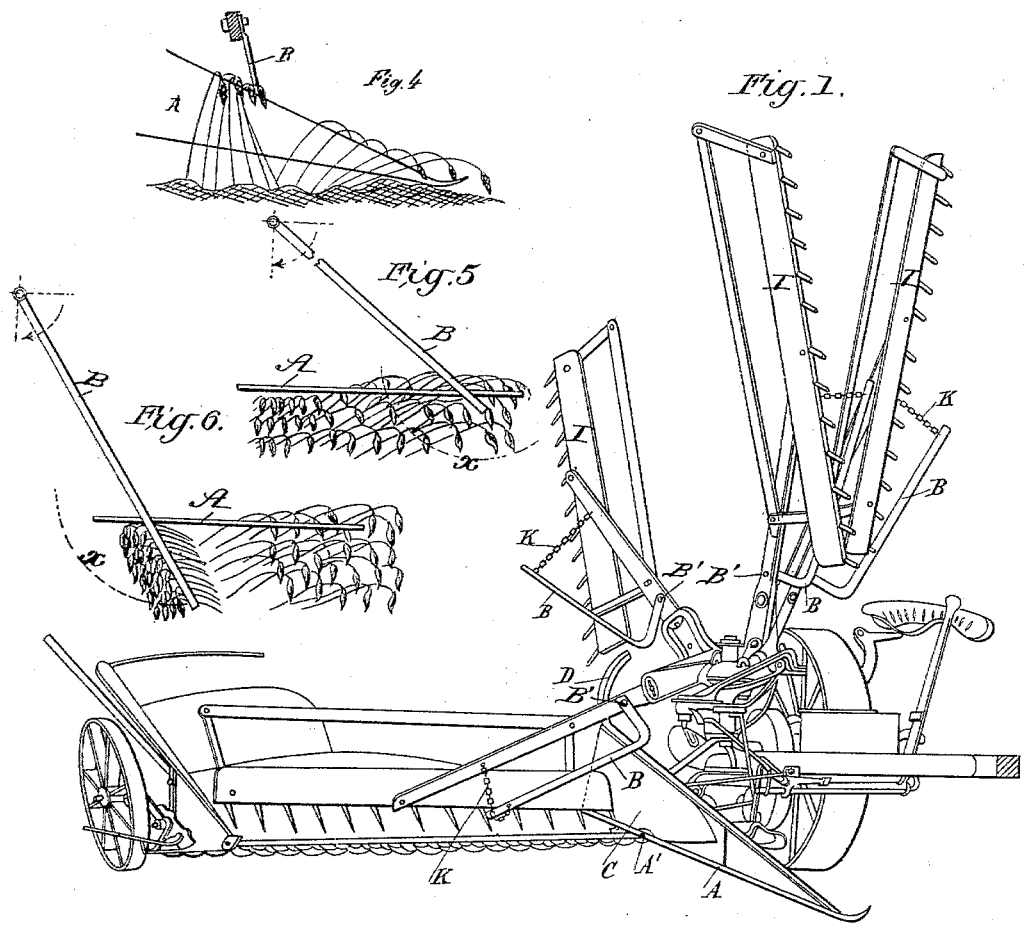
WITNESSES,
Julius Lutz
A. Lurcott
INVENTOR:
W. Jäger
BY
[signature]
ATTORNEYS.

UNITED STATES PATENT OFFICE.

WILHELM JÄGER, OF KÄNKENDORF, GERMANY.

GRAIN-LIFTER FOR MOWING-MACHINES.

SPECIFICATION forming part of Letters Patent No. 597,580, dated January 18, 1898.

Application filed February 29, 1896. Serial No. 581,371. (No model.) Patented in Belgium February 29, 1896, No. 119,895; in Germany May 5, 1896, No. 86,704, and in England June 6, 1896, No. 4,608.

*To all whom it may concern:*

Be it known that I, WILHELM JÄGER, a subject of the King of Prussia, Emperor of Germany, residing at Känkendorf, in the Kingdom of Prussia and Empire of Germany, have invented a new and useful Grain-Lifter for Harvesters, (which has been patented in England, No. 4,608, dated June 6, 1896; in Belgium, No. 119,895, dated February 29, 1896, and in Germany, No. 86,704, dated May 5, 1896,) of which the following is a full, clear, and exact description.

My invention relates to mowing or harvesting machines, and has for its object to secure a reliable and uniform operation of the cutters of such machines. Grain-harvesters as ordinarily constructed are provided with arms or shields serving to divide the grain in swaths and to gather the stalks so as to guide them toward the cutters. It is of course desirable that the stalks should be cut as near the ground as possible; but the arms or shields hereinbefore mentioned do not raise or right the stalks in case they have been bowed down by heavy rains or other influences, and in such a case the stalks are often cut near the ears, which clearly is objectionable. This applies particularly to the stalks standing nearest to the cut previously made by the machine—that is, the stalks on the stubble side—as such stalks are deprived of the support afforded by adjoining stalks. The stalks farther distant from the cut or stubble side will remain more or less upright, or, if they hang down, they will be raised whenever the stalks nearest to the stubble side are raised, owing to their contact with such stalks.

My improved harvester is provided with devices whose object is to raise the stalks to an approximately upright position, said devices being constructed and arranged as hereinafter described and claimed.

Reference is to be had to the accompanying drawings, forming a part of this specification, in which similar characters of reference indicate corresponding parts in all the views.

Figure 1 is a perspective view of the improved machine. Figs. 2 to 6 illustrate the action of the improved devices for raising the stalks, Figs. 2, 3, and 4 being elevations and Figs. 5 and 6 plan views.

The machine is provided on the stubble side with the usual divider or shield C, which is stationary. Between this shield and the driving-gear of the cutters is located a lifting-arm A, extending longitudinally of the machine and preferably capable of a slight upward and downward movement. Such upward movement may be provided for by pivoting the lifting-arm A upon the finger-bar, as shown at A'. The free end of the lifting-arm A normally rests on the ground and is somewhat curved upward, so that it may easily ride over uneven ground while the machine is traveling. Since this lifting-arm always is in engagement with the ground at its free end, it is a very effective means for raising the stalks even when the grain is lying very close to the ground. I prefer to construct said lifting-arm of a frame consisting of iron bars covered with sheet metal.

In addition to the lifting-arm it is necessary to provide other devices for holding the stalks in an erect position until they are engaged by the cutters. For this purpose I have constructed the usual rakes I, which are employed to deposit the cut grain in windrows, with arms or supports B, which are adapted to move in contact with the upper edge of the lifting-arm during the forward movement of the said rakes. These supports or arms are made in the shape of rods pivotally connected at one end to the rakes, as at B', and of angular formation, the free ends of the said rods being limited in their movement by means of chains K, which are secured to the rakes. During the forward movement of the rakes the supports B, by their weight, rest on the upper edge of the lifting-arm A and remain in such engagement until all the slack of the chain K has been taken up. The engagement of the supports with the lifting-arm is not affected by any unevenness of the ground; but it will be understood that preferably the upper edge of the lifting-arm is given such a formation that its distance from the rake-head will not be greater than the extent of the movement of the supports. In order to prevent the jar which might ensue if the supports B were suddenly disengaged from the lifting-arm A, the latter at its rear end is provided with a curved extension or guide D, which supports the rods B until the chains K have been drawn tight.

The operation of the improved machine will be understood best by reference to Figs. 2 to 6. Fig. 2 shows the action which would be obtained if the lifting-arm A were used alone. In this case the stalks on the stubble side, and through their medium those in contact with them, would be lifted to an upright position; but when the stalks would reach the rear portion of said arm, as at O, they would drop off the same into an inclined position, as indicated by dotted lines, and thus the apparatus would not fulfil the purpose for which it is intended.

Figs. 3 to 6 show how the supports B work in unison with the lifting-arm A. As will be seen in said views, the supports B travel on the upper edge of the lifting-arm, and thus prevent the ears from dropping off said arm, as will be clearly understood by reference to Fig. 4. The supports B also assist the action of the cutter by pressing the grain toward the knives. The operation of the supports B is further improved by the fact that the angle $x$, formed between the lifting-arm A and the supports B, gradually becomes smaller during the forward movement of the rakes.

It will be seen that the improved device is comparatively simple and capable of attachment to harvesters of ordinary construction, while it will effectively perform its functions even under very unfavorable circumstances.

Having thus described my invention, I claim as new and desire to secure by Letters Patent—

1. A grain-harvester, provided on the stubble side of the cutter with a lifting-arm extending longitudinally of the machine, and supports held to travel on said lifting-arm to raise the grain to an upright position, substantially as described.

2. A grain-harvester provided on the stubble side of the cutter with a lifting-arm extending longitudinally of the machine, and loosely connected thereto so as to be capable of swinging up and down, and supports held to travel on said lifting-arm, as and for the purpose set forth.

3. A grain-harvester provided on the stubble side of the cutter with a lifting-arm extending longitudinally of the machine, rakes to gather the cut grain, and supports secured to said rakes and adapted to travel on the lifting-arm as and for the purpose set forth.

4. A grain-harvester, provided on the stubble side of the cutter with a lifting-arm extending longitudinally of the machine, rakes to gather the cut grain, and supports pivotally connected to said rakes and adapted to slide over the lifting-arm, substantially as described.

5. A grain-harvester, provided on the stubble side of the cutter with a lifting-arm extending longitudinally of the machine, rakes to gather the cut grain, supports pivotally connected to said rakes and adapted to travel over the lifting-arm, and chains connecting the free ends of the said supports to the rakes to limit the movement of the said supports, substantially as described.

6. A grain-harvester, provided on the stubble side of the cutter with a lifting-arm extending longitudinally of the machine and having an extension at one end, rakes to gather the cut grain, supports pivoted to the rakes and held to travel over the lifting-arm and the extension thereof, and chains connecting the free ends of the supports to the rakes, the extension of the lifting-arm affording a rest for the said supports until the chains have been drawn tight, as and for the purpose set forth.

In witness whereof I have hereunto set my hand in presence of two witnesses.

WILHELM JÄGER.

Witnesses:
PEREGRINE VARNALS,
WILHELM SCHWIETHAL.